United States Patent [19]

Bergman et al.

[11] 3,816,072

[45] June 11, 1974

[54] POLYESTER DYEING ASSISTED BY 2-(2,4,6-TRIBROMOPHENOXY)-ETHANOL

[75] Inventors: Sylvester Bergman; Richard Garth Pews, both of Midland, Mich.

[73] Assignee: The Dow Chemical Company, Midland, Mich.

[22] Filed: Feb. 14, 1973

[21] Appl. No.: 332,321

Related U.S. Application Data

[62] Division of Ser. No. 166,248, July 26, 1971, Pat. No. 3,758,335.

[52] U.S. Cl. ............................ 8/173, 8/21 C, 8/17
[51] Int. Cl. ...................... D06p 1/82, D06p 3/54
[58] Field of Search............................. 8/93, 173, 17

[56] References Cited
UNITED STATES PATENTS
3,617,211   7/1969   Dawson ................................. 8/173

Primary Examiner—Donald Levy
Attorney, Agent, or Firm—David H. Thurston

[57] ABSTRACT

Polyester, cellulose triacetate, and polyamide fibers are made fire-retardant by contacting with an aqueous dispersion of 2-(2,4,6-tribromophenoxy)ethanol. This compound also functions as a dye assistant for polyester and cellulose triacetate and can be used in an aqueous dyebath to serve both purposes for those fibers. The treated fibers are resistant to loss of the brominated compound during laundering and dry cleaning processes.

4 Claims, No Drawings

POLYESTER DYEING ASSISTED BY 2-(2,4,6-TRIBOMOPHENOXY)-ETHANOL

This is a division, of application Ser. No. 166,248 Filed July 26, 1971, now Pat. No. 3,758,335.

BACKGROUND OF THE INVENTION

The present invention relates to the use in polyester, nylon, and cellulose triacetate fibers of a novel fire retardant agent which also imparts dye receptivity to the treated polyester and triacetate fibers. The invention also relates to the fibers treated by the new process.

Fabrics and fibers of polyester or cellulose triacetate are ordinarily dyed with so-called disperse dyes which act by incorporation of the dye molecules directly into the fiber structure to form a solid solution. In order to facilitate this process, these fibers are treated with a dye assistant prior to or in the course of the dyeing process. According to one theory, the dye assistant functions by swelling the fiber and so facilitating uniform absorption of the dye. Usually, the dye assistant is incorporated into the aqueous dye-bath and the fiber or fabric is treated simultaneously with both the dye assistant and the dyestuff. Typical dye assistants are biphenyl, salol, o-phenylphenol, trichlorobenzene, benzoic acid, and methyl salicylate.

Nylon fibers are also dyed with disperse dyes as well as a number of other types. However, since polyamides are relatively receptive to dyes, the dyeing process is adjusted to the particular polymer by the type of dye used, pH of the dyebath, and so on rather than by use of a dye assistant.

After the dyeing process, the dyed fiber is subjected to a hot scour to remove surface deposits of color and most of the dye assistant. The last traces of dye assistant are usually removed by a short heat treatment. Removal of essentially all of the dye assistants conventionally used is desirable, because most of these known substances adversely affect light-fastness if left in the dyed material. The prior art dye assistants may also adversely affect physical properties of the fiber, impart an undesirable odor, or have other such deleterious effects if not removed.

In recent years there has developed an increasing urgency toward making textile fabrics more resistant to burning. This has been done by a surface treatment of the dyed fabric with one or more fire-retardant chemicals and it has also been done by incorporating a fire-retardant compound into a polymer fiber as a plasticizer or merely as an additive. Fire-retardant monomers have been copolymerized into the polymer structure to obtain this effect. However, all of these methods are subject to characteristic disadvantages. Surface treatment of a fabric usually has only a temporary effect and the fire-retardant chemical is rapidly lost when the fabric is laundered or dry cleaned. Additives to the polymer physically mixed with or incorporated chemically into the polymer usually detract seriously from the properties of the polymer fiber so that while the fire-retarding effect may be relatively permanent, the fiber is often more brittle, of lower tensile strength, or with less resistance to oxidative degradation.

SUMMARY OF THE INVENTION

It has now been found that essentially permanent fire retardant properties are imparted to polyester, polyamide, and cellulose fibers when these fibers are contacted with an aqueous bath having dispersed therein a fire-retarding concentration of 2-(2,4,6-tribromophenoxy)ethanol.

Preferably, this invention is used in the process for dyeing a polyester or cellulose triacetate fiber with a disperse dye wherein the fiber is made both dye-receptive and fire-retardant by contacting the fiber with 2-(2,4,6-tribromophenoxy)ethanol which then functions both as a fire retardant agent and as a dye assistant. This is best accomplished by contacting the fiber or fabric with a hot aqueous dyebath containing the disperse dye and other additives conventionally used in the dyeing process together with about 5–20 per cent based on the weight of fiber of 2-(2,4,6-tribromophenoxy)ethanol as the dye assistant. The invention is, of course, used in a similar manner for polyamide fibers or fabric. In this case, the brominated additive serves only to make the nylon fire-retardant.

DETAILED DESCRIPTION

When treated or dyed by this process as described, the fiber contains about 3–15 per cent by weight of the brominated compound and it is thereby rendered substantially and permanently more resistant to burning. Carpeting, for example, treated or dyed by this process will pass the so-called "tablet test" (DOC FFI-70). The brominated compound is an efficient dye assistant as well as an effective and essentially permanent fire retardant additive and the dyed fabrics have the same depth of shade as materials dyed in the same way using a conventional dye assistant such as biphenyl.

A special advantage of the tribromophenoxyethanol is that the light-fastness and physical properties of fibers dyed by this process are not effected. The dyed material has no undesirable odor and its physical appearance is the same as that dyed by conventional processes.

A particular and surprising advantage of the present invention when used in the dyeing process is the fact that the 2-(2,4,6-tribromophenoxy)ethanol not only need not be removed from the dyed material, but it is actually so firmly held in the fiber that it is highly resistant to loss during laundering or dry cleaning operations. The scour step following the dyeing process can thus either be eliminated entirely or modified to a briefer or milder treatment for removing surface color only.

The advantageous combination of properties appears to be unique to 2-(2,4,6-tribromophenoxy)ethanol. Other closely related brominated compounds such as (pentabromophenoxy)ethanol and 2-(2,4,6-tribromophenoxy)-2-propanol lack one or more of the necessary features such as the required amount of solubility in water, a suitably high melting point so as to avoid spotting and uneven treatment of the fiber, and ability to make the fiber dye-receptive and so act as a dye assistant or carrier in the aqueous disperse dye bath in the case of polyester and cellulose triacetate fibers.

This new dye assistant and/or fire retardant can be used with any of the disperse dyes used to dye polyester, polyamide, and cellulose triacetate fibers. It can be used either as the sole dye assistant in the dyeing process or in combination with a conventional dye assistant such as biphenyl with fibers where a dye assistant is needed. Some representative disperse dyes are C. I. (Color Index) Disperse Red (C. I. 11110) C. I. Disperse Blue 55, C. I. Disperse Red 60, C. I. Disperse Yellow 23 (C. I. 26070), and C. I. Disperse Red 55.

Disperse Red 60, and Disperse Blue 55 are all anthraquinone type dyes. Disperse Red 1 and Disperse Yellow 23 are monoazo and disazo type dyes respectively and these are further identified by their Color Index numbers as given.

The term "polyester" is used herein in its usual sense to mean highly polymeric, essentially linear and saturated polyester resins made by the reaction of a dicarboxylic acid or ester with a diol in the presence of an esterification or ester interchange catalyst. Illustrative dicarboxylic acids are malonic, succinic, adiptic, azelaic, hydromuconic, isophthalic, terephthalic, and cyclohexanedicarboxylic acids. Representative diols are ethylene glycol, propylene glycol, butylene glycol, and 1,6-hexanediol. The common commercial polyester resins are polyethylene terephthalate and polyethylene terephthalate modified by inclusion of minor proportions of a different glycol or dicarboxylic acid during the polyesterification process. The polyester used in the examples was polyethylene terephthalate.

Cellulose triacetate is used in its conventional sense to mean the fully esterified material where there has been little or no hydrolysis of the acetate groups on the cellulose molecule.

The term polyamide is also used in its conventional sense as a generic name for long chain synthetic polyamides where recurring amide groups form an integral part of the polymer chain. The term nylon is often used to mean the same thing. Examples are nylon 6, nylon 66, nylon 7, and nylon 11.

Example 1

An aqueous bath was made up to contain 10 percent 2-(2,4,6-tribromophenoxy)ethanol and 0.5 percent $NaH_2PO_4$, all based on the weight of fiber, and 0.2g/liter of Triton X100. The ratio of bath liquor to fabric was about 30:1. Samples of polyester cloth were put in the bath at 75°C, the bath was heated to boiling in 15 minutes and the fabric left in the boiling bath for 1 hour. The treated fabric was then rinsed and dried. The treated fabric retained by 6 percent by weight of 2-(2,4,6-tribromophenoxy)ethanol and had substantially reduced flammability as compared to the untreated material.

Comparable results are obtained when nylon or cellulose triacetate cloth is substituted for the polyester cloth used above.

Example 2

An aqueous dyebath was made up to contain 2 percent C. I. Disperse Blue 55, 10 percent 2-(2,4,6-tribromophenoxy)-ethanol, and 0.5 percent $NaH_2PO_4$, all based on the weight of fiber dyed, and 0.2 g. per liter of Triton X-100. The ratio of dyebath liquor to fabric was about 30:1. Samples of polyester cloth and polyester carpeting were put in the bath at 75°C, the bath was heated to boiling in 15 minutes, and the fabrics were left in the boiling bath for one hour. The dyed fabrics were then rinsed and dried.

The dyed fabrics had the same depth of shade as samples dyed in the usual way with biphenyl or other conventional dye carriers. The fabrics also retained about 6 percent by weight of 2-(2,4,6-tribromophenoxy)ethanol and had substantially reduced flammability as compared to the undyed materials.

Example 3

Strips of the dyed cloth from Example 2 were compared for flammability with strips of the original cloth using a test wherein a strip of cloth is held in a semicircular arc with the two ends extending downwardly and one of the ends is ignited. The length of the burn to the point where the flame goes out is then a relative measure of flammability. By this test, the flammability of the dyed cloth was only about 50% of that of the undyed material.

Comparable results are obtained when nylon or cellulose triacetate cloth is substituted for the polyester cloth used in Examples 2 and 3. The triacetate cloth requires a slightly higher bromine content to have the same level of resistance to burning.

Example 4

Samples of conventionally dyed polyester carpet and similar carpet dyed by this process and containing about 6 percent by weight of 2-(2,4,6-tribromophenoxy)ethanol are compared for flammability using the standard "tablet test" (DOC FFI-70). The carpet dyed by this process easily passes the test, the burned area being only about 1 inch in diameter whereas the conventionally dyed carpet sample is entirely consumed. Similarly, conventionally dyed polyester fabric is made resistant to burning by contacting it with an aqueous dispersion of 2-(2,4,6-tribromophenoxy)-ethanol otherwise similar to the aqueous dyebath described in Example 2.

We claim:

1. A dyeing process comprising applying to a linear polyester, or cellulose acetate fibers an aqueous bath which contains a despersed dye and 2-(2,4,6-tribromophenoxy) ethanol.

2. The process of claim 1 wherein the fiber is contacted with a hot aqueous dyebath containing a disperse dye and about 5–20 per cent based on the weight of fiber of 2-(2,4,6-tribromophenoxy)ethanol.

3. The process of claim 1 wherein the fiber is a polyester.

4. The process of claim 1 wherein the fiber is a cellulose triacetate.

* * * * *

PO-1050
(5/69)

UNITED STATES PATENT OFFICE
CERTIFICATE OF CORRECTION

Patent No. 3,816,072  Dated June 11, 1974

Inventor(s) Sylvester Bergman and Richard Garth Pews

It is certified that error appears in the above-identified patent and that said Letters Patent are hereby corrected as shown below:

Column 2, line 65, insert --1-- after the word 'Red'

Column 3, line 11, delete "adiptic" and insert --adipic--

Column 3, line 41, delete "by", 1st occ. and insert -- about -- .

Column 3, line 50, delete "pre-" and insert --per- --

Column 3, line 54, delete "Titon" and insert --Triton--

Column 4, line 46, delete "despersed" and insert --dispersed--

Signed and sealed this 8th day of October 1974.

(SEAL)
Attest:

McCOY M. GIBSON JR.
Attesting Officer

C. MARSHALL DANN
Commissioner of Patents